United States Patent [19]

Nagaoka et al.

[11] Patent Number: 4,519,484

[45] Date of Patent: May 28, 1985

[54] MULTIPLE CLUTCH TRANSMISSION HAVING GEAR CONTROL DEVICE

[75] Inventors: Mitsuru Nagaoka; Kazuya Oda; Shizuo Sumida, all of Hiroshima, Japan

[73] Assignee: Mazda Motor Corporation, Hiroshima, Japan

[21] Appl. No.: 467,846

[22] Filed: Feb. 18, 1983

[30] Foreign Application Priority Data

Feb. 22, 1982 [JP] Japan ................... 57-27127

[51] Int. Cl.³ .................. B60K 41/22; F16H 5/42; F16H 5/60
[52] U.S. Cl. ................... 192/3.58; 74/330; 74/336 R; 192/3.61; 192/48.9
[58] Field of Search .................. 192/3.55, 3.57, 3.58, 192/3.61, 48.9, 87.13, 87.14, 87.18, 87.19; 74/321, 322, 324, 329, 330, 333, 336 R, 359, 363

[56] References Cited

U.S. PATENT DOCUMENTS

| | | | |
|---|---|---|---|
| 3,691,861 | 9/1972 | Sturmer | 74/330 |
| 3,834,499 | 9/1974 | Candellero et al. | 192/3.58 |
| 3,863,518 | 2/1975 | Webber et al. | 192/3.57 |

FOREIGN PATENT DOCUMENTS

| | | | |
|---|---|---|---|
| 1249708 | 9/1967 | Fed. Rep. of Germany | 74/330 |
| 951410 | 1/1943 | France | 74/330 |
| 56-94050 | 7/1981 | Japan. | |
| 2064028 | 6/1981 | United Kingdom. | |
| 2070158 | 9/1981 | United Kingdom | 74/359 |

OTHER PUBLICATIONS

Auto Car—Mar. 29, 1980—p. 15.
Auto Car—May 23, 1981.

Primary Examiner—Rodney H. Bonck
Assistant Examiner—Alan G. Towner
Attorney, Agent, or Firm—Fleit, Jacobson, Cohn & Price

[57] ABSTRACT

A multiple clutch type transmission including a plurality of input shafts, a plurality of clutch devices for releasably and alternately connecting respective ones of said input shafts with an engine output shaft. Each of the input shafts has two driving gears mounted thereon to rotate therewith, a countershaft having freely rotatable driven gears which are in meshing engagement with respective ones of the driving gears on the input shafts, connecting hubs provided on the countershaft for axial sliding movements for selectively connecting the driven gears with the countershaft, clutch actuators for controlling said clutch devices so that selected one of the input shafts is connected through selected one of the clutch devices with the engine output shaft. Hub actuators are provided for actuating the connecting hubs so that selected ones of the driven gears are connected with the countershaft, a control circuit being provided for producing a clutch engaging signal upon receipt of a gear engaging command to thereby engage disengaged one of the clutch devices to establish a substantially synchronized condition between the connecting hub and selected one of the driven gears, then a clutch disengaging signal for disengaging the same clutch device and thereafter a hub actuating signal to operate the hub actuator so that the connecting hub is actuated to thereby connect selected one of the driven gears with the countershaft.

9 Claims, 7 Drawing Figures

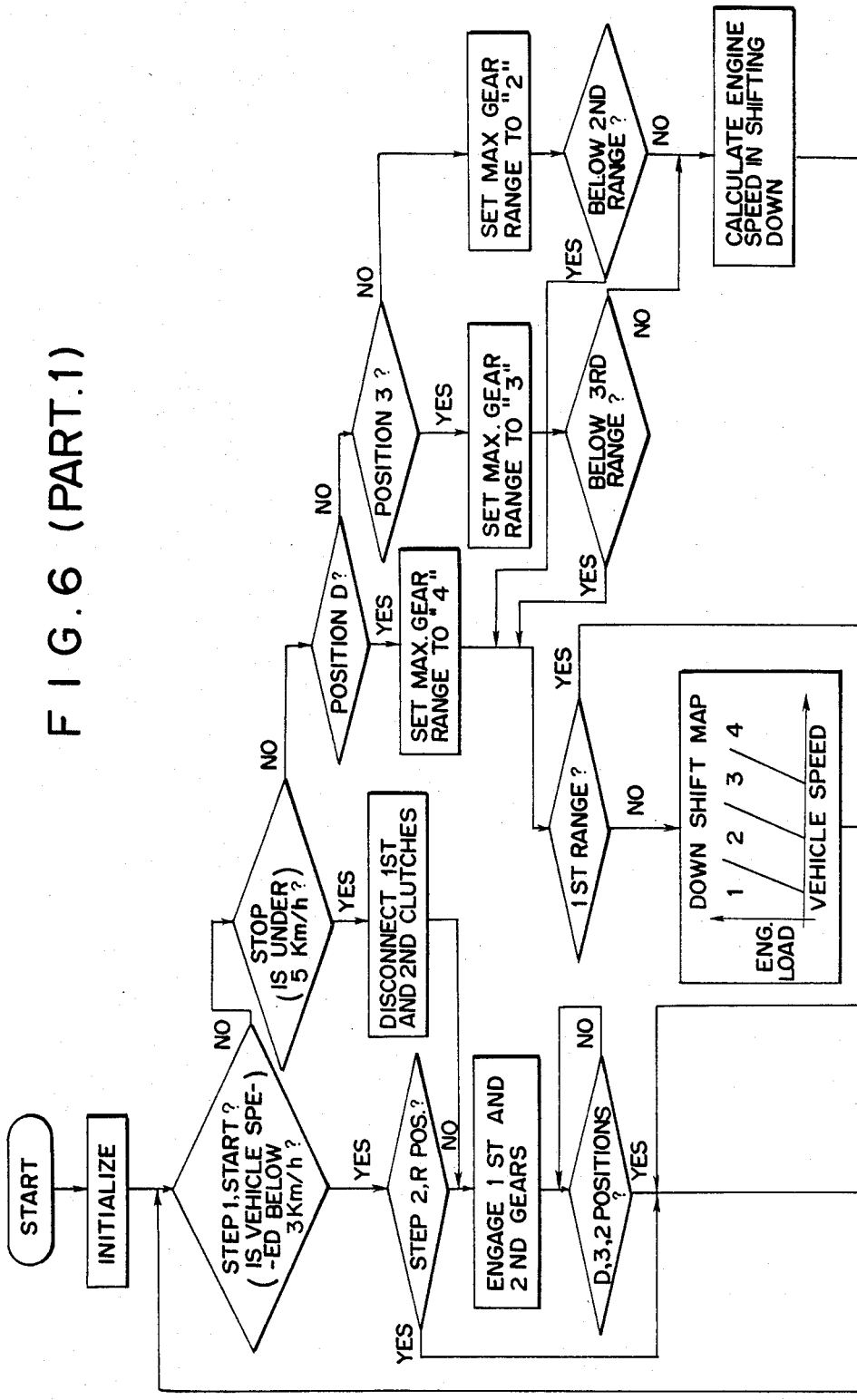
FIG.6 (PART.1)

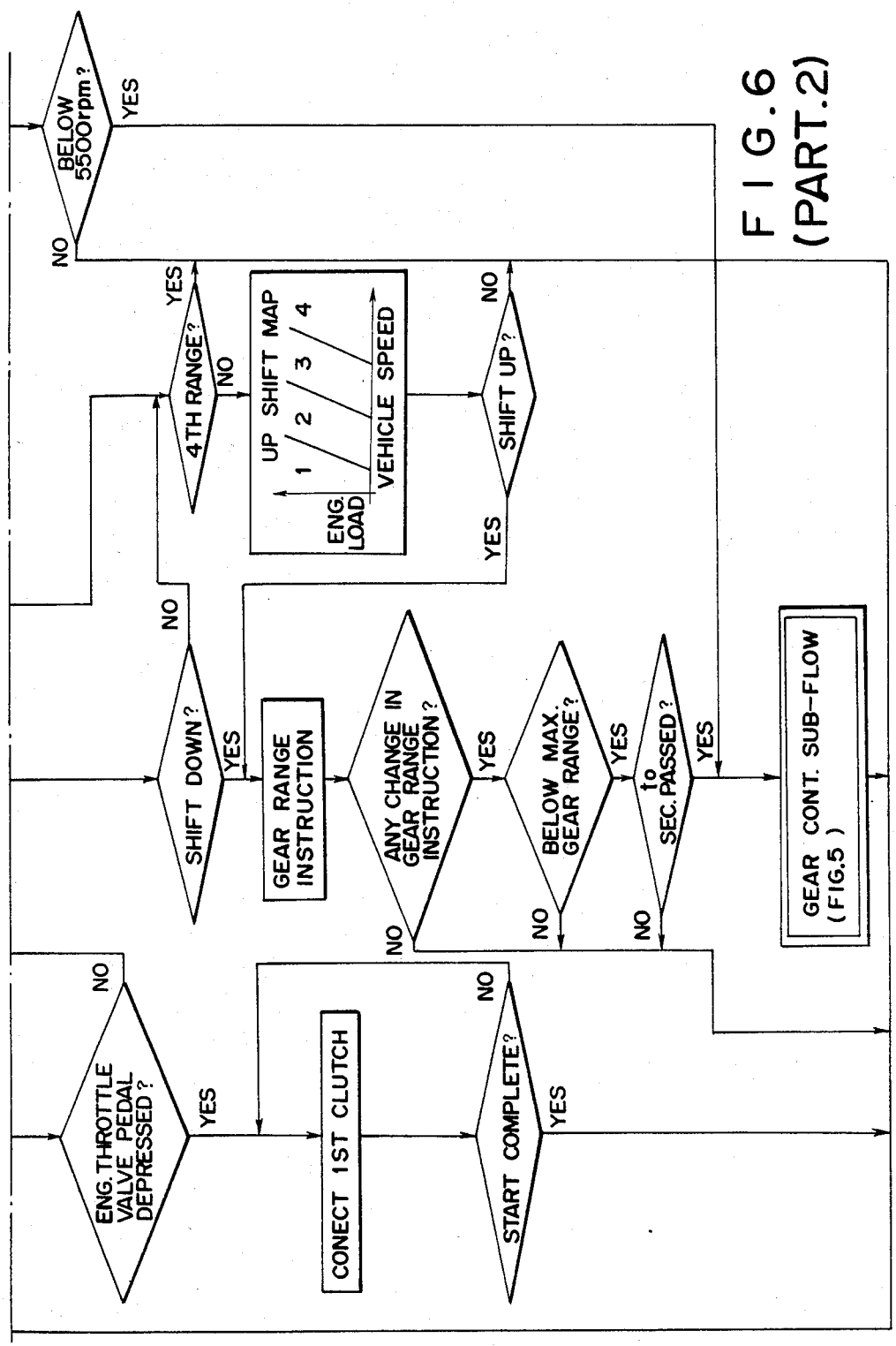
FIG.6 (PART.2)

MULTIPLE CLUTCH TRANSMISSION HAVING GEAR CONTROL DEVICE

The present invention relates to multiple-stage automobile power transmissions and more particularly to transmissions having a plurality of clutch devices. More specifically, the present invention pertains to clutch controls for such transmissions.

Among known multiple-stage gear transmissions for automobile use, the most widely used ones are of counter-shaft type which includes an input shaft which is adapted to be connected with the engine output shaft through a clutch mechanism and carries a plurality of gears which are arranged with meshing engagement respectively with gears on a counter-shaft extending in parallel with the input shaft so as to provide a plurality of gear trains. For the purpose of changing gear ratios in this type of gear transmission, the operator is required at first to disengage the clutch so that the input shaft of the transmission is disconnected from the engine output shaft simultaneously releasing the engine throttle valve control pedal to close the engine throttle valve. This procedure makes manual gear changing operation complicated and moreover due to this complicated gear changing operation this type of transmission cannot be adopted in automatic transmissions.

There are known types of gear mechanisms which are suitable for use in automatic transmissions. These types of gear mechanisms include a plurality of gear trains comprised of intermeshing gears and associated with clutches and brakes for selecting one of such gear trains. Planetary gear mechanisms belong to this type and have been widely used in automatic transmissions. It should however be noted that planetary type gear mechanisms are disadvantageous in respect of weight and efficiency and hydraulic torque converters have to be used with such gear mechanisms when they are used in automatic transmissions.

Known counter-shaft type transmissions include such types in which it is not required to close the engine throttle valve each time when gear shifting is made. For example, the magazine "Auto Car" Mar. 29, 1980 issue and May 23, 1981 issue and Japanese patent disclosure 56-94050 corresponding to the British Pat. No. 2,064,028 disclose a transmission which includes two coaxially arranged input shafts adapted to be connected respectively through clutch mechanisms with an engine output shaft, one of the input shafts carrying first and third stage gears and the other carrying second and fourth stage gears. A counter-shaft is provided in parallel with the input shafts and carries counter gears which are always in meshing engagement with the gears on the input shafts. The input shafts are provided with connecting hubs which are adapted to connect selectively the gears on the input shafts to the input shafts on which such gears are mounted. When one of the input shafts is engaged with the engine output shaft and one of the gears thereon, for example, the first or third stage gear is drivingly connected thereto through the associated connecting hub, the other input shaft is disconnected from the engine output shaft and during this period of operation one of the gears, for example, the second or fourth gear on the shaft is connected with the same shaft. Thereafter, the aforementioned one input shaft is disconnected from the engine output shaft and at the same time the other input shaft is connected with the engine output shaft to complete a gear shifting operation. Theoretically, three or more input shafts may be provided with corresponding number of clutch mechanisms. The only requirement is that the gears on one input shaft shall not be of adjacent gear stages.

In this type of transmission, problems have been encountered in that the connecting hub is in spline engagement with the output shaft to rotate therewith, whereas the gear which is to be connected with the output shaft is in a substantially stationary condition so that a substantial load is applied to a synchronizing mechanism which is normally provided in the transmission gear set. Thus, the gears and the connecting hubs may be excessively worn or sometimes broken in gear shifting operations. Further, a substantial time is consumed in having the selected transmission gear set engaged.

The gears on the input shafts may be so provided that they always rotate with the associated input shafts but the gears on the countershaft may be selectively engaged with the countershaft. Even with this arrangement, similar problems are encountered.

It is therefore an object of the present invention to ensure smooth gear shifting operations in the aforementioned multiple clutch type gear transmissions.

Another object of the present invention is to provide means for ensuring smooth gear engagement in such multiple clutch type gear transmissions, to eliminate or minimize wear or breakage of gears which may be encountered during gear engaging operations.

According to the present invention, the above and other objects can be accomplished, in a multiple clutch type transmission including a plurality of input shafts, a plurality of clutch devices for releasably and alternately connecting respective ones of said input shafts with an engine output shaft, each of said input shafts being associated with at least one set of transmission gears for disengageably connecting the input shaft associated therewith to an output element of the transmission, means for controlling said clutch devices so that selected one of said input shafts is connected through selected one of said clutch devices with the engine output shaft, gear engaging means for engaging selected set of said transmission gears so that selected one of said input shafts is connected with the output elements, control means for producing a clutch engaging signal upon receipt of a gear engaging command to thereby engage disengaged one of said clutch devices to establish a substantially synchronized condition in a selected set of said transmission gears, then a clutch disengaging signal for disengaging the clutch device and thereafter a gear engaging signal to operate said gear engaging means for the selected set of the transmission gears to engage the same gear set.

According to another aspect of the present invention, there is provided a multiple clutch type transmission including a plurality of input shafts, a plurality of clutch devices for releasably and alternately connecting respective ones of said input shafts with an engine output shaft, each of said input shafts having at least one driving gear mounted thereon to rotate therewith, a countershaft having freely rotatable driven gears which are in meshing engagement with respective ones of the driving gears on the input shafts, connecting hub means provided on said countershaft for axial sliding movement for selectively connecting said driven gears with said countershaft, means for controlling said clutch devices so that selected one of said input shafts is connected through selected one of said clutch devices with the engine output shaft, hub actuating means for actuating said connecting hub means so that selected one of said driven gears is connected with said countershaft, control means for producing a clutch engaging signal upon receipt of a gear engaging command to thereby engage disengaged one of said clutch devices to decrease a difference in rotating speed between said connecting hub means and selected one of said driven gears, then a clutch disengaging signal for disengaging the same clutch device and thereafter a hub actuating signal to operate said hub actuating means so that said connecting hub means is actuated to thereby connect selected one of the driven gears with said counter-shaft.

According to a further aspect of the present invention, there is also provided a multiple clutch type transmission including a plurality of input shafts, a plurality of clutch devices for releasably and alternately connecting respective ones of said input shafts with an engine output shaft, each of said input shafts having at least one driving gear mounted thereon for free rotation, a countershaft having driven gears which are mounted on said countershaft to rotate therewith and in meshing engagement with respect ones of the driving gears on the input shafts, at least one connecting hub provided on each of said input shafts for axial sliding movement for selectively connecting selected one of said driven gears with associated one of said input shafts, means for controlling said clutch devices so that selected one of said input shafts is connected through selected one of said clutch devices with the engine output shaft, hub actuating means for actuating selected one of said connecting hubs so that selected one of said driving gears is connected with said input shafts, control means for producing a clutch engaging signal upon receipt of a gear engaging command to thereby engage disengaged one of said clutch devices to decrease a difference in rotating speed between said selected connecting hub and selected one of said driving gears, then a clutch disengaging signal for disengaging the same clutch device and thereafter a hub actuating signal to operate said hub actuating means so that said selected connecting hub is actuated to thereby connect selected one of the driving gears with the associated input shaft.

The above and other objects and features of the present invention will become apparent from the following descriptions of a preferred embodiment taking reference to the accompanying drawings, in which:

FIG. 6 (parts 1 and 2) is a flow chart showing general operations of the control circuit; and, FIG. 7 is a view similar to FIG. 1 but showing another embodiment.

Figure 1:
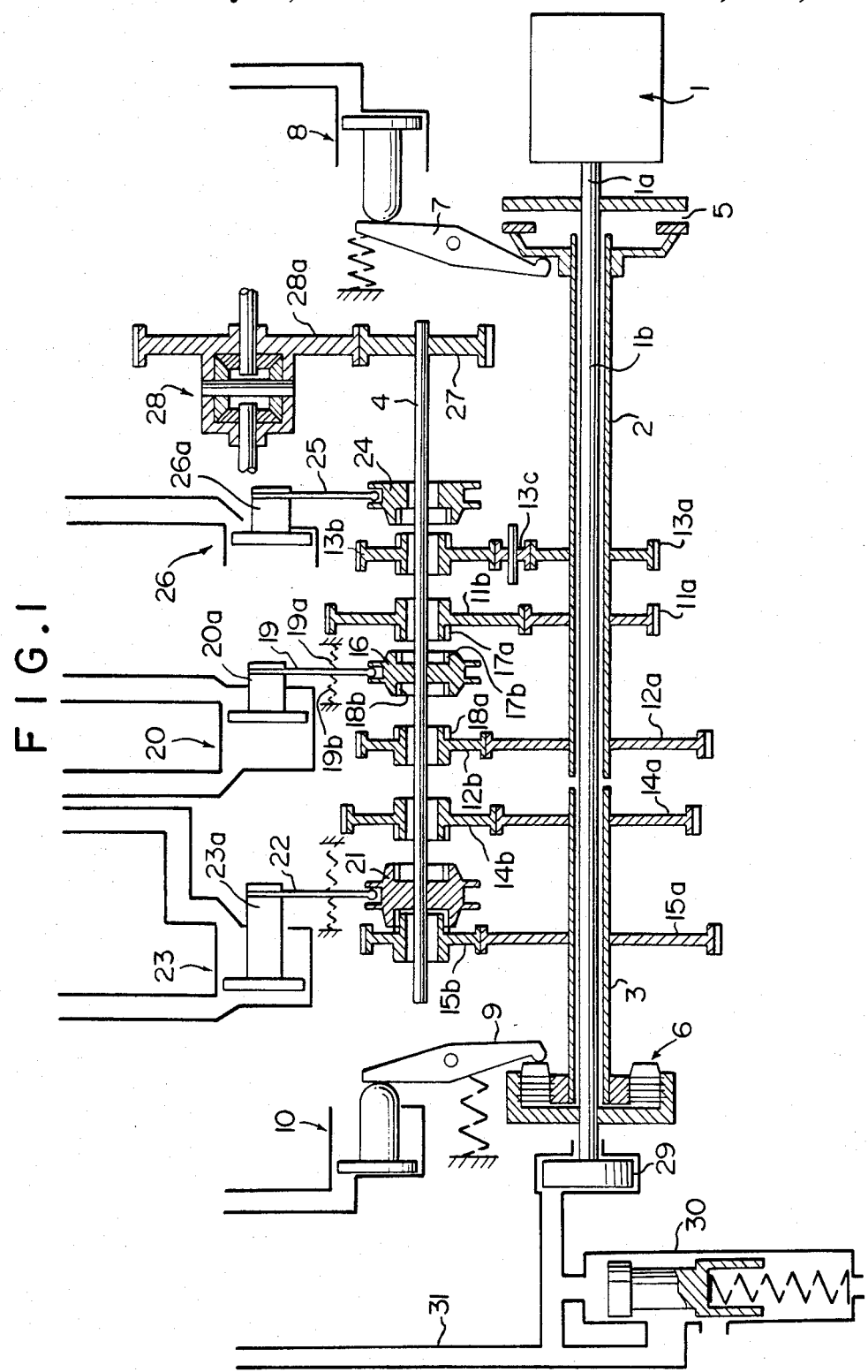
FIG. 1 is a diagrammatical view of a transmission in which the present invention can be embodied.

Referring to the drawings, particularly to FIG. 1, there is shown an engine 1 having a crankshaft 1a which is provided with a coaxially extending output shaft 1b. On the output shaft 1b, there are rotatably mounted a first input shaft 2 and a second input shaft 3 and a transmission output shaft 4 is provided in parallel with the input shafts 2 and 3. A first clutch 5 is provided for connecting one end of the first input shaft 2 with the engine output shaft 1b. At the opposite end, the second input shaft 3 is provided with a second clutch 6 for connecting the shaft 3 with the engine output shaft 1b. It is preferable that the first clutch 5 be of a dry disc type which has a large torque transmitting capacity. The clutch 5 is associated with a clutch actuating lever 7 for controlling the operation of the clutch 5. A first clutch actuator 8 is provided for actuating the clutch actuating lever 7 when a hydraulic pressure is applied thereto thereby engaging the clutch 5. The second clutch 6 may be of a relatively compact wet type and is associated with a second clutch actutating lever 9. A second clutch actuator 10 of hydralic type is provided to actuate the lever 9 when hydraulic pressure is applied thereto so as to make the second clutch 6 engage.

The first input shaft 2 carries a first stage driving gear 11a and a third stage driving gear 12a which are mounted thereon to rotate therewith and in meshing engagement respectively with a first stage driven gear 11b and a third stage driven gear 12b provided freely rotatably on the output shaft 4. The first input shaft 2 further carries a reverse driving gear 13a which is mounted thereon to rotate therewith and engaged through a counter gear 13c with a reverse driven gear 13b provided freely rotatably on the output shaft 4. The second input shaft 3 similarly carries a second stage driving gear 14a and a fourth stage driving gear 15a which are in meshing engagement respectively with a second stage driven gear 14b and a fourth stage driven gear 15b rotatably mounted on the output shaft 4.

On the output shaft 4, there is provided a shifting hub 16 between the driven gears 11b and 12b. The hub 16 is splined to the output shaft 4 so that the former rotates together with the latter but axially slidable with respect to the latter. The hub 16 is formed at the opposite end portions with teeth 17b and 18b, respectively, which are adapted to be brought into engagement respectively with gear teeth 17a and 18a formed on the gears 11b and 12b. It will therefore be understood that by moving the hub 16 along the output shaft 4 in the axial direction it is possible to bring one of the gears 11b and 12b into engagement with the output shaft 4. In order to actuate the shifting hub 16, there is provided a shift fork 19 which is connected with a piston 20a of a first shifting cylinder 20. The shift fork 19 is provided with springs 19a and 19b so that it is normally maintained in the neutral position wherein the hub 16 is disengaged from both of the driven gears 11b and 12b. Similarly, the output shaft 4 is provided between the gears 14b and 15b with a shifting hub 21 which is similar in structure to the shifting hub 16. The hub 21 is arranged so that it is actuated by a piston 23a of a second shifting cylinder 23 through a shift fork 22. On the output shaft 4, there is also provided a shifting hub 24 for the reverse driving gear 13a. The hub 24 is arranged so that it is actuated by a piston 26a of a third shifting cylinder 26 through a shift fork 25.

The output shaft 4 has an output gear 27 which is secured thereto and in meshing engagement with an input gear 28a of a differential gear assembly 28. At the free end of the output shaft 1b, there is provided an oil pump 29 which supplies a pressurized hydraulic oil through a pressure regulator 30 to a hydraulic pressure line 31.

Figure 2:
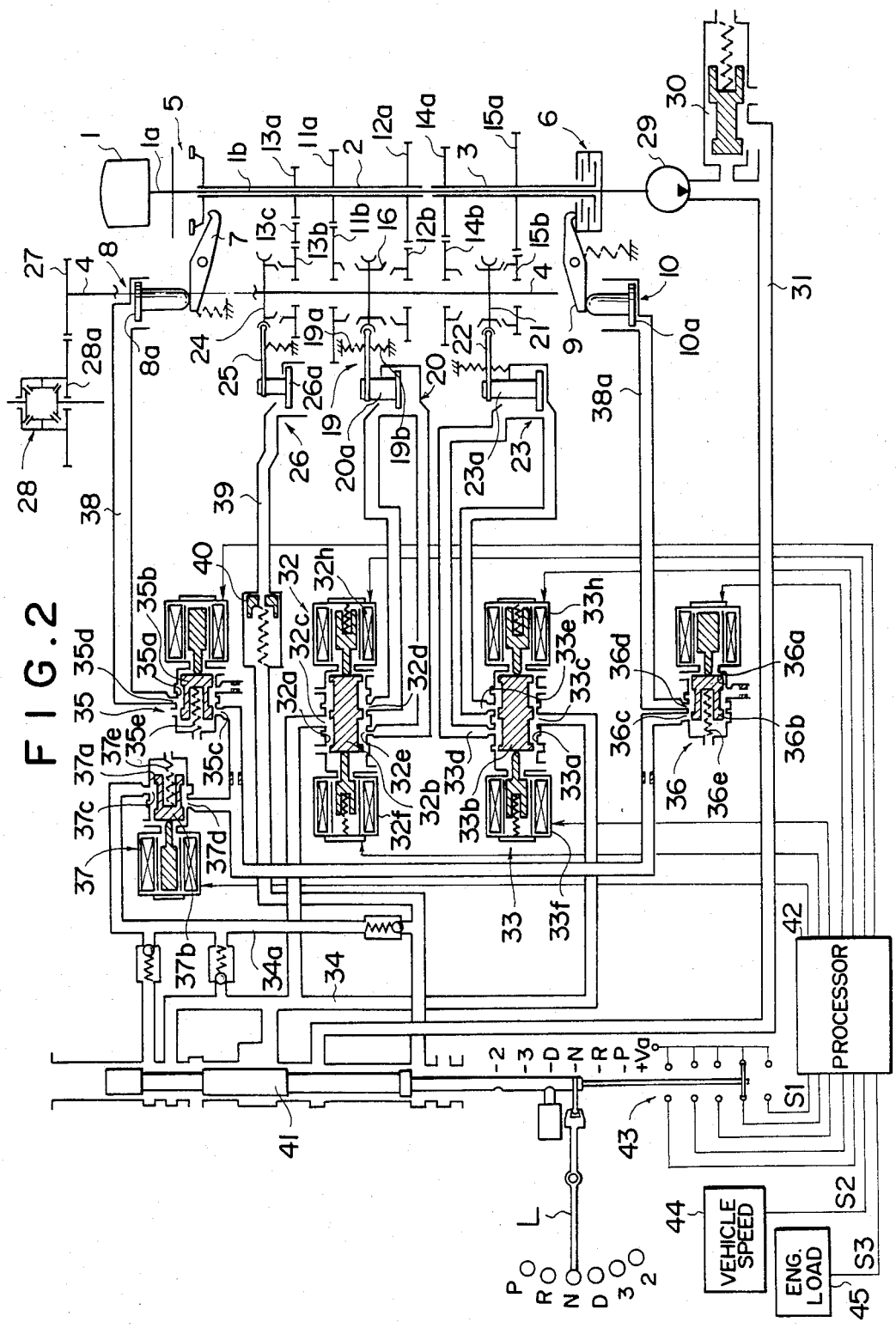
FIG. 2 is a diagram showing the hydraulic control circuit adopted in the transmission shown in FIG. 1.

Referring now to FIG. 2, it will be noted that the hydraulic control circuit shown therein includes a first shifting solenoid valve 32 for controlling the hydraulic pressure to the first shifting cylinder 20 and a second shifting solenoid valve 33 for controlling the hydraulic pressure to the second shifting cylinder 23. The first shifting solenoid valve 32 includes a valve bore 32a and a plunger 32b which is received in the valve bore 32a for axial sliding movement. The valve bore 32a is formed at an intermediate portion with a port 32c which is connected with a forward pressure line 34. At the opposite sides of the port 32c, there are formed ports 32d and 32e which are respectively connected with the opposite ends of the cylinder 20. The plunger 32b functions to alternately connect the port 32c to the port 32d or 32e when it is axially shifted. The plunger 32b is held normally in the neutral position wherein the port 32c is disconnected from the ports 32d and 32e. In this position, the piston 20a is held in the neutral position under the influence of the springs 19a and 19b so that the connecting hub 16 is disengaged from both of the driven gears 11b and 12b. The plunger 32b is associated at the opposite ends with solenoids 32f and 32h. When the solenoid 32h is energized, the plunger 32b is axially shifted toward left and the port 32c is connected with the port 32d so that the piston 20a in the cylinder 20 is forced to a position wherein the driven gear 12b is connected with the output shaft 4. When the solenoid 32f is engaged, the plunger 32b is shifted in the opposite direction so that the port 32c is connected with the port 32d. In this position, the piston 20a is forced in the opposite direction to thereby connect the driven gear 12b with the output shaft 4.

The second shifting solenoid valve 33 is similar in construction with the first valve 32 so that corresponding parts are designated by adding the same suffix. When the solenoid 33h is energized, the port 33c is connected with the port 33e so that the driven gear 14b is connected with the output shaft 4. When the solenoid 33f is energized, however, the port 33c is connected with the port 33d so that the driven gear 15b is connected with the output shaft 4.

For the purpose of controlling the clutches 5 and 6, there are provided a first control solenoid valve 35 and a second control solenoid valve 36. The valve 35 includes a valve bore 35a and a plunger 35b which is received in the valve bore 35a for axial sliding movement. The valve bore 35a is formed with a port 35c leading to a cut valve 37 which functions as a pressure regulating valve. The details of the cut valve 37 will be described later. The valve bore 35a is further formed with a port 35d which is connected through a passage 38 with one end 8a of a first actuator 8 for actuating the first clutch 5. At one end of the plunger 35b, there is a spring 35e which forces the plunger 35b in one axial direction to disconnect the ports 35c and 35d from each other. When the valve 35 is energized, the plunger 35b is shifted against the action of the spring 35e so that the ports 35c and 35d are connected together.

The second control solenoid valve 36 is similar in construction to the first valve 35 so that corresponding parts are shown by adding the same suffix. The port 36c is connected with the cut valve 37 whereas the port 36d is connected through the passage 38a with one end 10a of a second actuator 10 for actuating the second clutch 6.

The cut valve 37 includes a valve bore 37a and a plunger 37b which is received in the valve bore 37a for axial sliding movement. The valve bore 37a is formed with a port 37c which is connected with a pressure line 34a leading from the pressure line 34. The valve bore 37a is further formed with a port 37d which is connected with the ports 35c and 36c of the solenoid valves 35 and 36. At one end of the plunger 37a, there is provided a spring 37e so that the plunger 37b is forced toward the other end to a position wherein the ports 37c and 37d are communicated with each other. When the cut valve 37 is energized, the plunger 37b is shifted under the force of the spring 37e so that ports 37c and 37d are disconnected from each other.

The third shifting cylinder 26 for reverse control is connected with a reverse pressure line 39 which is provided with an orifice check valve 40. The valve 40 is closed for the liquid flow in the direction toward the cylinder 26 so that the liquid is allowed to pass to the cylinder 26 only through a restricting orifice but opened for the liquid flow in the opposite direction so that the liquid pressure in the cylinder can be rapidly released. The pressure line 31 from the oil pump 29 is connected through a shift valve 41 to the pressure line 34 and to the reverse pressure line 39, so that the line 31 is connected with the line 34 when the shift valve 41 is in either of the positions D, 3 and 2 but with the line 39 when the shift valve 41 is in the position R.

There is also provided a control circuit 42 which may be a commercially available microprocessor. The control circuit 42 is arranged so as to receive a position signal S1 from a shift valve position sensor 43, a vehicle speed signal S2 from a vehicle speed sensor 44 and an engine load signal S3 from an engine load sensor 45. The control circuit 42 is programmed so that it produces and supplies to the solenoids in the valves 32, 33, 35, 36 and 37 energizing currents in accordance with the signals S1, S2 and S3.

When the control circuit 42 is started to operate, the circuit 42 at first judges in the step 1 whether the vehicle is being started or not as shown in FIG. 6. If the vehicle speed is below 3 km/h, the procedure is advanced to the step 2 wherein detection is made as to whether the shift valve 41 is in the position R. Where the shift valve 41 is in a position other than the position R, the first and second stage driven gears are connected with the output shaft 4. Then, the position of the shift valve 41 is discriminated and where the shift valve is in either one of the positions D, 3 and 2, detection is made as to whether the engine throttle valve actuating pedal is depressed. If the pedal is depressed for vehicle start, the energizing current is applied to the solenoid valve 35 so that the ports 35c and 35d in the valve 35 are connected together. At the same time, the energizing current to the cut valve 37 is interrupted so that the line 34a is connected through the cut valve 37 and the solenoid valve 35 to the passage 38. Thus, the first clutch actuator 8 is applied with pressure at the side 8a so that it is moved to connect the first clutch 5. Thus, the vehicle is started to run. For the details of the control, reference is made to the flow chart shown in FIG. 6.

Figure 3:
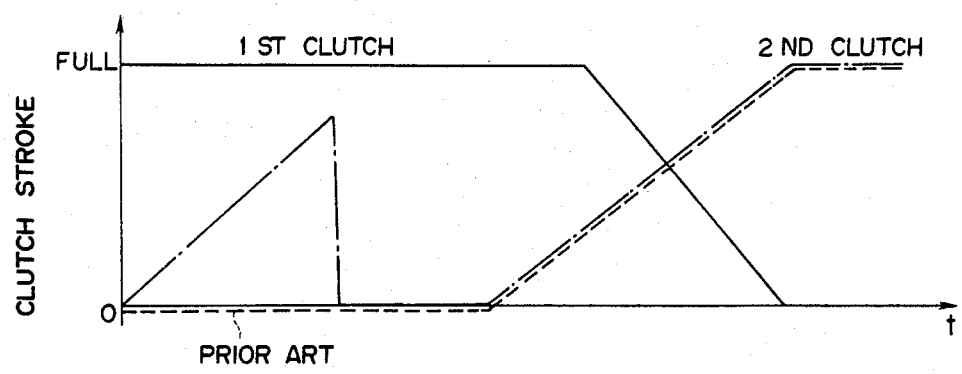
FIG. 3 is a chart showing clutch engaging operations.

For the purpose of gear shifting, discriminations and controls are performed in accordance with the positions of the shift valve. Referring to FIG. 6, it will be noted that where the shift valve 41 is in either of the positions D and 3, the gear shift control is performed in accordance with shift control maps which determine a desired gear stage under a specific vehicle speed and engine load. For example when the vehicle is running with the third stage gear, the solenoid 32h in the first shifting valve 32 and the solenoid in the first control valve 35 are energized so that the hydraulic pressure is applied to the first clutch 5 to engage the same and the connecting hub 16 is in engagement with the third stage driven gear 12b. At an appropriate timing which is determined in accordance with the vehicle speed and the engine load, the control circuit 42 produces an energizing current which is applied to the solenoid valve 36 when the vehicle reaches a speed suitable for shifting to the fourth stage. Thus, the actuator 10 is applied with the hydraulic pressure to thereby engage the second clutch 6 as shown in FIG. 3 so that the second clutch 6 is slowly engaged. While the second clutch 6 is being operated, the energizing current to the solenoid valve 35 is interrupted so that the first clutch actuator 8 is opened to a drain port and the first clutch 5 is disengaged under the force of the associated spring.

Figure 5:
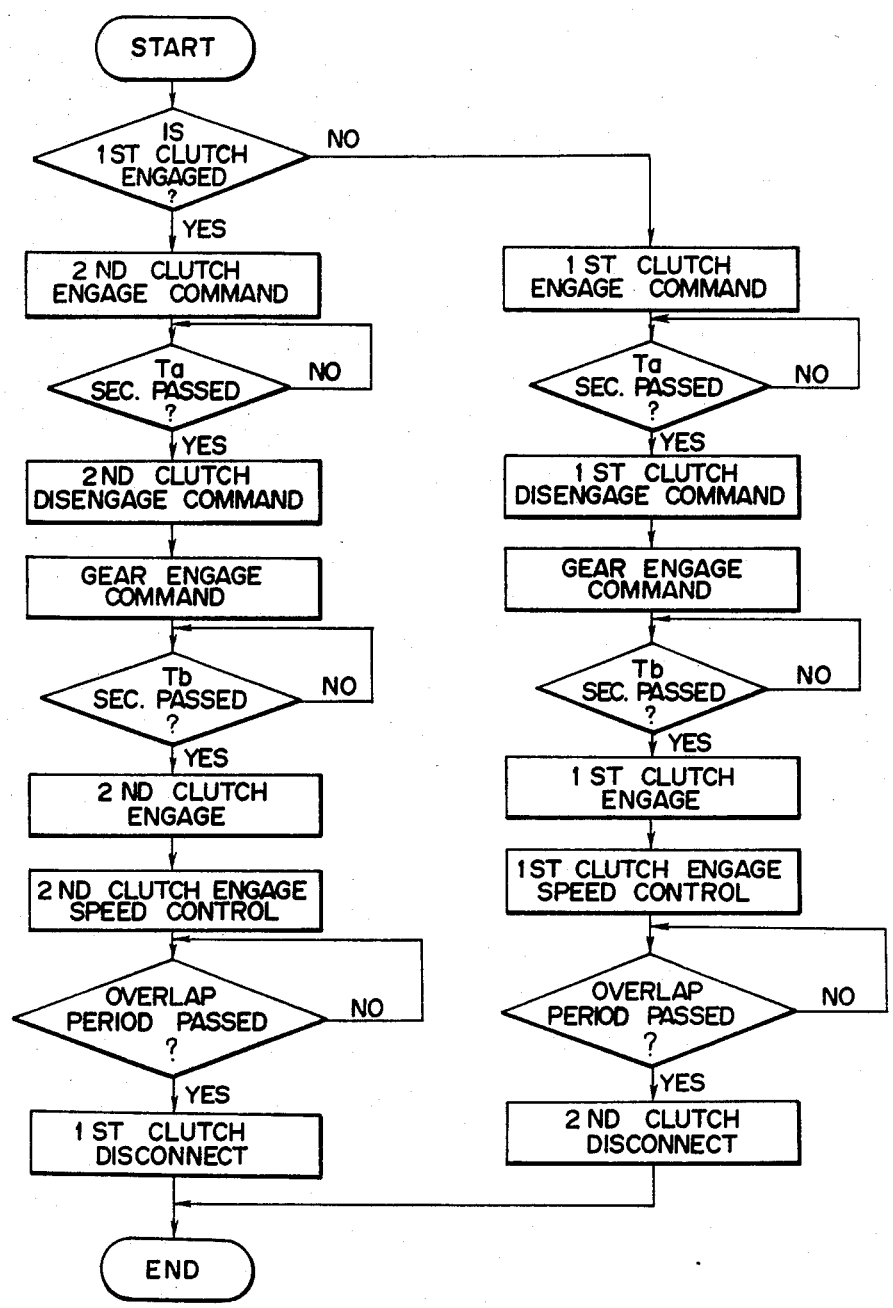
FIG. 5 is a flow chart showing the gear engaging operation of the control circuit.

Before the second clutch 6 is thus engaged, an energizing current is momentarily applied to the solenoid of the second control valve 36 as shown by a dot-and-dash line in FIG. 3 so that the second clutch 6 is momentarily engaged. Thus, the rotation of the engine output shaft 1$b$ is transmitted to the second input shaft 3 and the fourth stage driven gear 15$b$ on the output shaft 4 is then driven by the fourth stage driving gear 15$a$ on the second input shaft 3. Referring to FIG. 5, when a time period Ta has passed after the initiation of engagement of the second clutch 6, a second clutch engaging signal to the solenoid valve 36 is interrupted so that the hydraulic pressure to the actuator 10 is released to disengage the second clutch 6. The time period Ta may be determined so that the rotation of the fourth stage driven gear 15$b$ is appropriately synchronized with the rotation of the connecting hub 21. Alternatively, the rotating speed of the gear 15$b$ may be detected and the second clutch 6 may be disengaged when the speed of the gear 15$b$ reaches a predetermined value.

Figure 4:
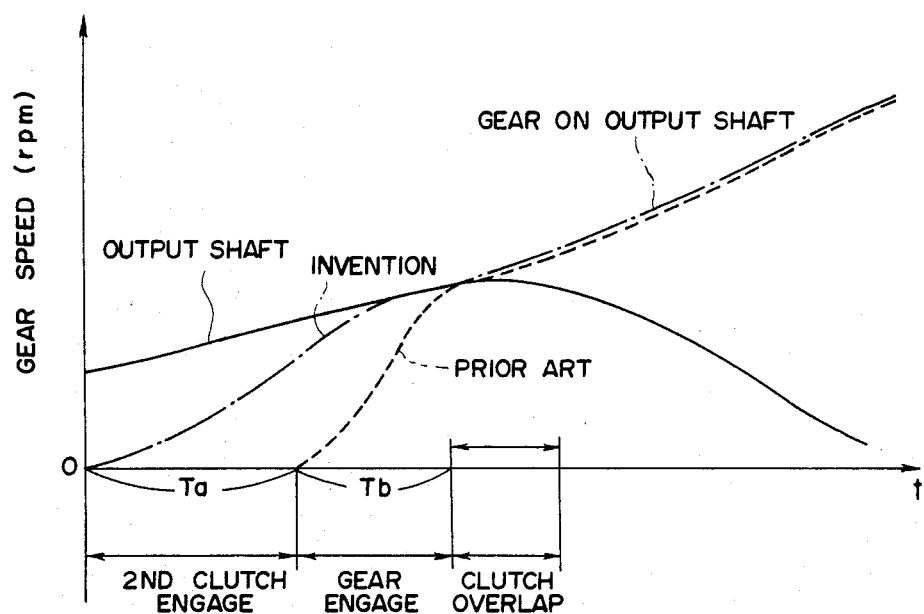
FIG. 4 is a chart showing gear speed in gear engaging operations.

Then, a gear engaging signal is produced by the control circuit 42 to engage the hub 21 with the fourth stage driven gear 15$b$. The signal energizes the solenoid 33$f$ in the solenoid valve 33 to connect the port 33$c$ with the port 33$d$ so that a hydraulic pressure is applied to the actuator 23. Thus, the piston 23$a$ is shifted and the connecting hub 21 is engaged with the fourth driven gear 15$b$. The hub 21 is rotating together with the output shaft 4 so that, if the driven gear 15$b$ is stationary, there will be a noticeable wear in the synchronizing mechanism which may appropriately be provided. It should however be noted that in accordance with the present invention the driven gear 15$b$ is preliminarily driven. The speed difference between the gear 15$b$ and the hub 21, as shown in FIG. 4, if any, is such that a smooth engagement can be ensured. Thus, it is possible to decrease the time required for engaging the gear 15$b$ with the hub 21. Further, it is also possible to decrease the wear of the synchronizing mechanism if provided. After a time period Tb from the completion of the engagement between the gear 15$b$ and the hub 21, the control circuit 42 produces a signal as shown in the flow chart of FIG. 5 to engage the second clutch 6. The engaging speed of the second clutch 6 may be appropriately controlled by energizing the solenoid in the cut valve 37 at appropriate timings so that a smooth clutch engagement is ensured.

After a suitable overlapping period Tc between two clutches 5 and 6, the current to the first control valve 35 is interrupted and the port 35$c$ is closed to interupt the supply of the hydraulic pressure to the clutch actuator 8. The overlap period Tc is desirable in automatic transmissions in order to make it possible to accomplish the gear shifting operations without significantly changing the engine load.

Figure 7:
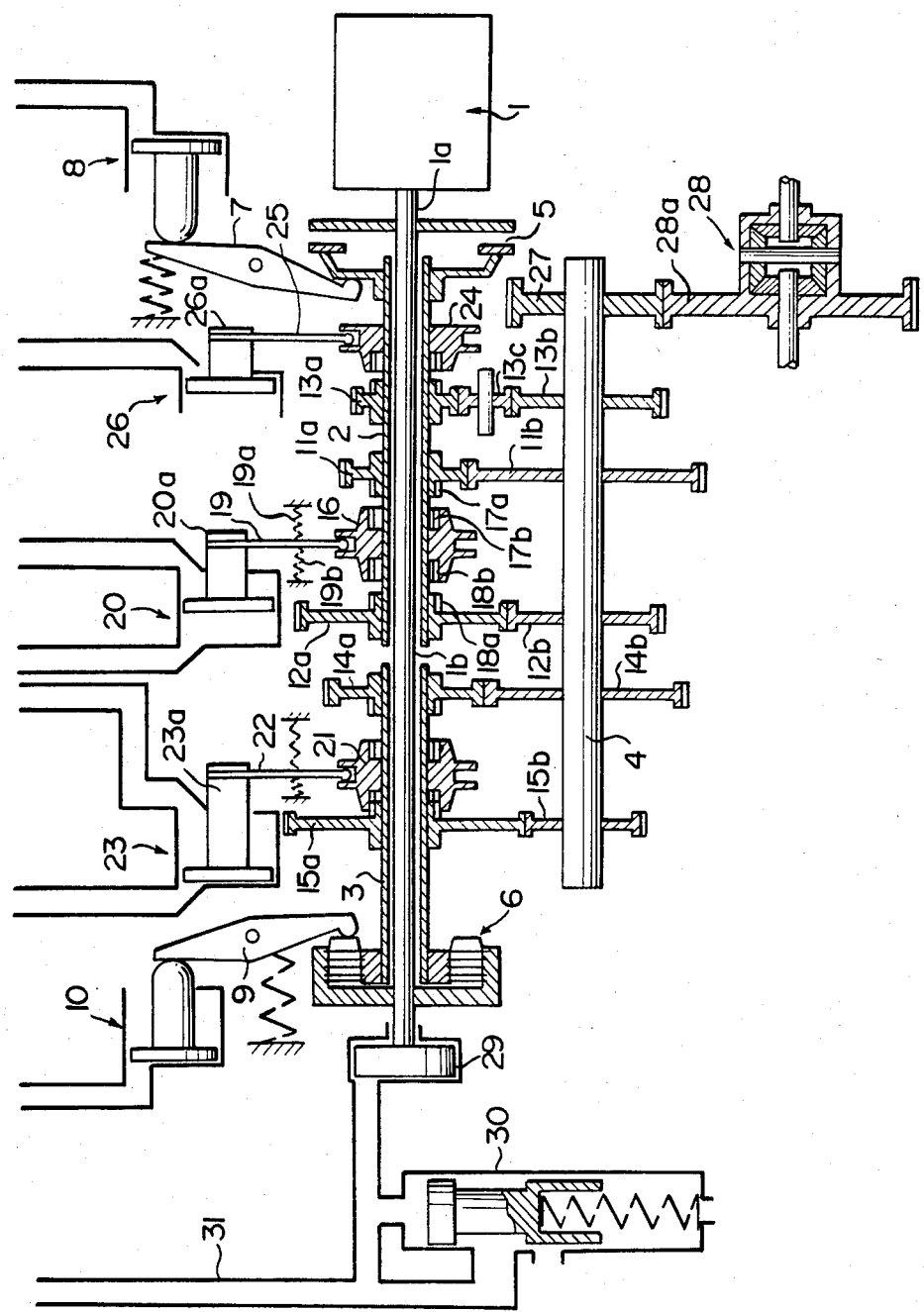

Referring now to FIG. 7, there is shown another embodiment of the present invention which is different from the previous embodiment in that the connecting hubs are provided on the input shafts 2 and 3. More specifically, the first input shaft 2 rotatably carries a first stage driving gear 11$a$ and a third stage driving gear 12$a$ which are in meshing engagement respectively with a first stage driven gear 11$b$ and a third stage driven gear 12$b$ provided on the output shaft 4. The first input shaft 2 further carries rotatably a reverse driving gear 13$a$ which is engaged through a counter gear 13$c$ with a reverse driven gear 13$b$ provided on the output shaft 4. The second input shaft 3 rotatably carries a second driving gear 14$a$ and a fourth driving gear 15$a$ which are in meshing engagement respectively with a second driven gear 14$b$ and a fourth driven gear 15$b$ securely mounted on the output shaft 4.

On the first input shaft 2, there is provided a shifting hub 16 between the gears 11$a$ and 12$a$. The hub 16 is splined to the first input shaft 2 so that the former rotates together with the latter but axially slidable with respect to the latter. The hub 16 is formed at the opposite end portions with teeth 17$b$ and 18$b$, respectively, which are adapted to be brought into engagement respectively with gear teeth 17$a$ and 18$a$ formed on the gears 11$a$ and 12$a$. It will therefore be understood that by moving the hub 16 along the first input shaft 2 in the axial direction it is possible to bring one of the gears 11$a$ and 12$a$ into engagement with the first input shaft 2. In order to actuate the shifting hub 16, there is provided a shift fork 19 which is connected with a piston 20$a$ of a first shifting cylinder 20. Similarly, the second input shaft 3 is provided between the gears 14$a$ and 15$a$ with a shifting hub 21 which is similar in structure to the shifting hub 16. The hub 21 is arranged so that it is actuated by a piston 23$a$ of a second shifting cylinder 23 through a shift fork 22. On the first input shaft 2, there is also provided a shifting hub 24 for the reverse driving gear 13$a$. The hub 24 is arranged so that it is actuated by a piston 26$a$ of a third shifting cylinder 26 through a shift fork 25. In other respects, the arrangements are the same as in the previous embodiment and control of the operations are performed in the same manner. More specifically, in this arrangement, the driving gears on the disengaged input shaft are rotated due to the meshing engagement with the driven gears on the output shaft, whereas the hub on the disengaged input shaft may be stationary. Therefore, the disengaged input shaft is momentarily driven by connecting the disengaged clutch device to thereby give a rotation to the hub on the disengaged input shaft before the engagement between the driven gear and the hub is made on the disengaged input shaft.

The invention has thus been shown and described with reference to a specific embodiment, however, it should be noted that the invention is in no way limited to the details of the illustrated arrangement but changes and modifications may be made without departing from the scope of the appended claims.

We claim:

1. A multiple clutch type transmission including a plurality of input shafts, a plurality of clutch devices for releasably and alternately connecting respective ones of said input shafts with an engine output shaft, each of said input shafts being associated with at least one set of transmission gears for disengageably connecting the input shaft associated therewith to an output element of the transmission, means for controlling said clutch devices so that selected one of said input shafts is connected through selected one of said clutch devices with the engine output shaft, gear engaging means for engaging selected set of said transmission gears so that selected one of said input shaft is connected with the output elements, control means for producing a clutch engaging signal upon receipt of a gear engaging command to thereby engage disengaged one of said clutch devices to establish a substantially synchronizing condition in a selected set of said transmission gears, then a clutch disengaging signal for disengaging the clutch device and thereafter a gear engaging signal to operate said gear engaging means for the selected set of the transmission gears to engage the same gear set.

2. A multiple clutch type transmission in accordance with claim 1 in which said control means further includes means for producing a clutch engaging signal for engaging said disengaged clutch device and clutch disengaging signal for disengaging engaged one of the clutch devices.

3. A transmission in accordance with claim 1 in which said control means includes means for producing said clutch engaging signal for a predetermined time.

4. A transmission in accordance with claim 1 in which said clutch controlling means and said gear engaging means are of a hydraulic type and an electromagnetically controlled hydraulic circuit is provided for these means.

5. A transmission in accordance with claim 1 in which said control means includes means for producing said gear engaging command in accordance with a gear shifting map which is based on a vehicle speed and engine load.

6. A multiple clutch type transmission including a plurality of input shafts, a plurality of clutch devices for releasably and alternately connecting respective ones of said input shafts with an engine output shaft, each of said input shafts having at least one driving gear mounted thereon to rotate therewith, a countershaft having freely rotatable driven gears which are in meshing engagement with respective ones of the driving gears on the input shafts, connecting hub means provided on said countershaft for axial sliding movement for selectively connecting said driven gears with said countershaft, means for controlling said clutch devices so that selected one of said input shafts is connected through selected one of said clutch devices with the engine output shaft, hub actuating means for actuating said connecting hub means so that selected one of said driven gears is connected with said countershaft, control means for producing a clutch engaging signal upon receipt of a gear engaging command to thereby engage disengaged one of said clutch devices to decrease a difference in rotating speed between said connecting hub means and selected one of said driven gears, then a clutch disengaging signal for disengaging the same clutch device and thereafter a hub actuating signal to operate said hub actuating means so that said connecting hub means is actuated to thereby connect selected one of the driven gears with said countershaft.

7. A transmission in accordance with claim 6 in which said connecting hub means includes a connecting hub which is adapted for alternate engagement with two driven gears, spring means being provided for normally maintaining said hub in a neutral position wherein it does not engage with both of the two driven gears.

8. A multiple clutch type transmission including a plurality of input shafts, a plurality of clutch devices for releasably and alternately connecting respective ones of said input shafts with an engine output shaft, each of said input shafts having at least one driving gear mounted thereon for free rotation, a counter-shaft having driven gears which are mounted on said countershaft to rotate therewith and in meshing engagement with respective ones of the driving gears on the input shafts, at least one connecting hub provided on each of said input shaft for axial sliding movement for selectively connecting selected one of said driven gears with associated one of said input shafts, means for controlling said clutch devices so that selected one of said input shafts is connected through selected one of said clutch devices with the engine output shaft, hub actuating means for actuating selected one of said connecting hubs so that selected one of said driving gears is connected with said input shafts, control means for producing a clutch engaging signal upon receipt of a gear engaging command to thereby engage disengaged one of said clutch devices to decrease a difference in rotating speed between said selected connecting hub and selected one of said driving gears, then a clutch disengaging signal for disengaging the same clutch device and thereafter a hub actuating signal to operate said hub actuating means so that said selected connecting hub is actuated to thereby connect selected one of the driving gears with the associated input shaft.

9. A transmission in accordance with claim 3 in which said connecting hub means includes a connecting hub which is adapted for alternate engagement with two driving gears on the same input shaft, spring means being provided for normally maintaining said hub in a neutral position wherein it does not engage with both of the two driven gears.

* * * * *